United States Patent [19]

Müller et al.

[11] Patent Number: 5,335,963
[45] Date of Patent: Aug. 9, 1994

[54] ATTENDANT PASSENGER SEAT ROW INCLUDING ASSIST SPACE

[75] Inventors: Hans-Jürgen Müller, Henstedt-Ulzburg; Wilfried Sprenger, Issendorf, both of Fed. Rep. of Germany

[73] Assignee: Deutsche Airbus GmbH, Hamburg, Fed. Rep. of Germany

[21] Appl. No.: 927,687

[22] Filed: Aug. 6, 1992

[30] Foreign Application Priority Data

Aug. 6, 1991 [DE] Fed. Rep. of Germany ....... 4125958

[51] Int. Cl.⁵ ............................................. B60N 1/02
[52] U.S. Cl. ..................................... 297/244; 297/14; 297/232
[58] Field of Search ................. 297/244, 14, 232, 243, 297/245, 248, 331, 484, 341, 342, 343

[56] References Cited

U.S. PATENT DOCUMENTS

| | | | |
|---|---|---|---|
| 117,599 | 8/1871 | Buok | 297/244 X |
| 242,997 | 6/1881 | Simonson | 297/244 X |
| 396,271 | 1/1889 | Demarest | 297/244 X |
| 3,594,037 | 7/1971 | Sherman | 297/14 |
| 3,762,764 | 10/1973 | McJunkin | 297/14 |
| 4,460,215 | 7/1984 | Chamberlain et al. | 297/14 |
| 4,832,404 | 5/1989 | Baymak et al. | 297/244 X |
| 4,881,702 | 11/1989 | Slettebak | 297/232 X |
| 4,902,069 | 2/1990 | Lehnert | 297/14 |

Primary Examiner—Peter M. Cuomo
Assistant Examiner—Jerry Redman
Attorney, Agent, or Firm—Anderson, Kill, Olick & Oshinsky

[57] ABSTRACT

An attendant-passenger seat row is disclosed comprising at least one passenger seat and one flight attendant seat. At least one adapter is in the region of the flight attendant seat and is connectable with a junction coupling in the region of the passenger seat. The flight attendant seat comprises generally a frame, an adapter, a back rest connected to the frame, as well as a seating area or seat cushion pivotable with respect to the back rest.

8 Claims, 3 Drawing Sheets

ATTENDANT PASSENGER SEAT ROW INCLUDING ASSIST SPACE

FIELD OF THE INVENTION

The present invention is directed to a seat row arrangement and more particularly to such arrangement on various modes of transportation, including aircraft, wherein the arrangement comprises at least on passenger seat and one flight attendant seat.

BACKGROUND OF THE INVENTION

During air travel, flight attendants typically stand while performing their various duties. During take-offs and landings, however, they are typically required, by various regulations, to be seated and are generally seated at the front or rear of the aircraft cabin, at a distance from the remaining passengers.

In emergency situations, flight attendants have various other duties, including, for example, the operation of emergency cabin doors during emergency landings. Under such circumstances, it may be easier, more prudent and reassuring to the passengers to have the attendants sit adjacent the emergency doors.

Moreover, when flight attendants sit in a remote location with respect to the passengers, additional frame structures must be constructed for such seats. If flight attendants sit in special seats, but in the same row as at least another passenger seat, the flight attendant's seat may share some of the frame of the passenger seat, thereby reducing construction costs.

It is therefore an object of the present invention to enable flight attendant personnel to assume seats, especially during the starting and landing operations to eliminate any hazard or danger particularly during these times.

Another object of the invention is to provide flight attendant seats in such a way that they occupy a comparatively small volume when not used. This provides the required assist space (12"×20") according to FAR/JAR in case of emergency evacuations.

A still further object of the invention is to combine flight attendant seats with passenger seats in a shared or adjacent frame.

Yet another objection of the invention is to provide a flight attendant seat in a row with a passenger seat wherein the flight attendant seat is adjacent to an exit door.

SUMMARY OF THE INVENTION

These and other objects of the invention, which will become apparent hereafter are achieved by the attendant-passenger seat row arrangement having a passenger seat, a flight attendant seat and at least one adapter in the region of the flight attendant seat connectable to a junction coupling in the region of the passenger seat. The flight attendant seat generally comprises a frame carrying the adapter, a back rest connected to the frame and a seat cushion or seating surface pivotable relative to the back rest.

The adapter facilitates the connection of the flight attendant seat by a junction coupling in the region of the passenger seat. The pivotable seating surface of the flight attendant seat means that it consumes a smaller volume when the flight attendant seat is not being used and also improves accessibility of the adapter and the junction coupling in the course of performing an assembly.

To obtain the same line of sight for passengers and flight attendants, the passenger seats, as well as the flight attendant seats, may have the same orientation. Alternatively, the flight attendant can be made to face the passengers by having the passenger seats and the flight attendant seats point in different directions.

BRIEF DESCRIPTION OF THE DRAWINGS

The invention will be better understood by the Detailed Description of the Preferred embodiment, in connection with the drawings, of which.

DETAILED DESCRIPTION OF THE PREFERRED EMBODIMENT

Figure 1:
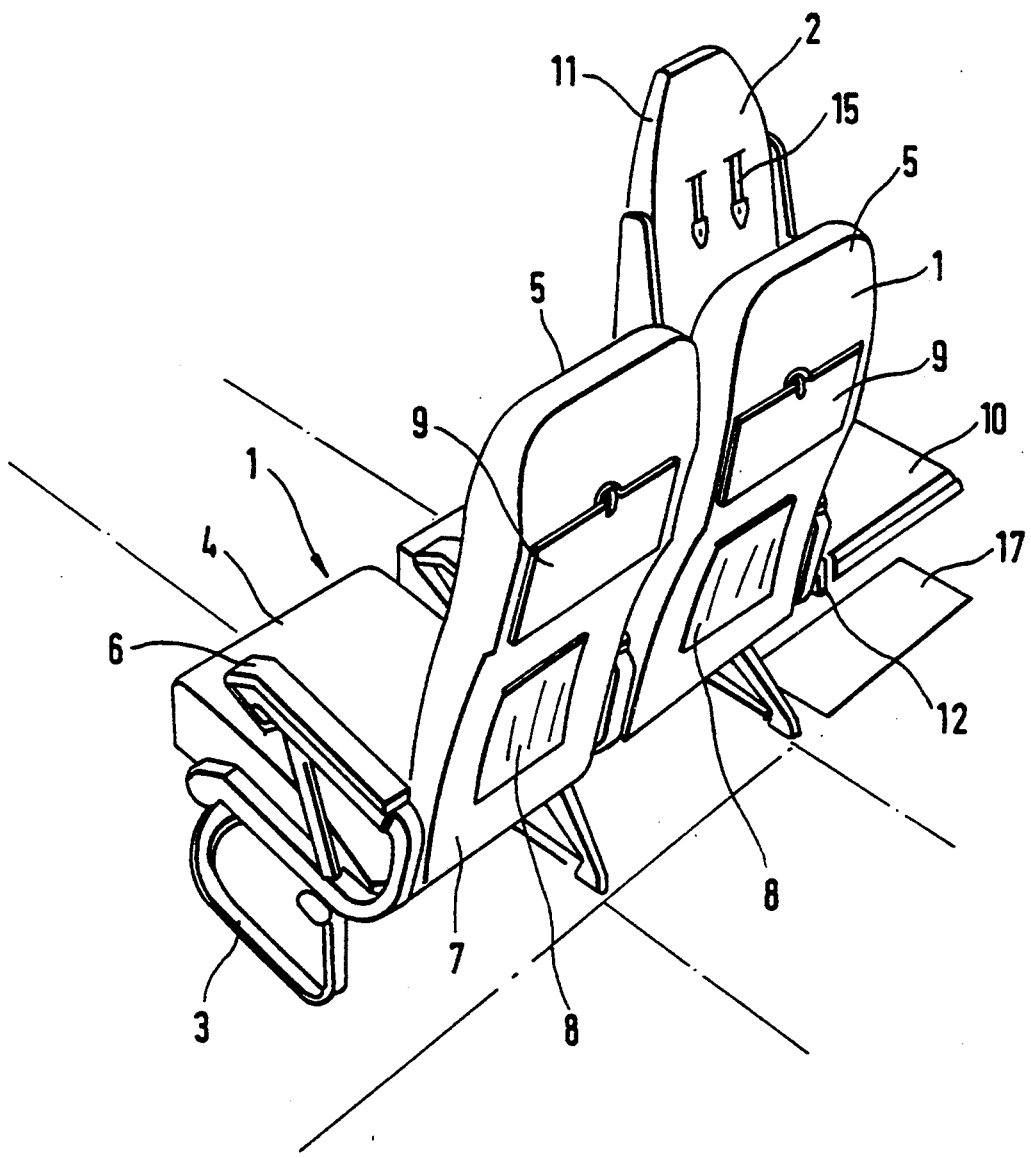
FIG. 1 is a perspective view of the attendant-passenger seat row shown as comprising two passenger seats and one flight attendant seat.

Referring now to the drawings, wherein like numerals reflect like elements throughout the several views, FIG. 1 is a perspective view of an attendant-passenger seat row comprising two passenger seats 1 and one flight attendant seat 2. The passenger seats 1 are supported by frame 3 which sits on the cabin floor. The seats 1 comprise seat cushions 4, back rests 5 and arm rests 6 in the seating area and storage pockets 8, as well as folding tables 9 on the rear wall 7.

Flexibility in manufacture and simplified assembly using standardized components is made possible by connecting the flight attendant seat 2 to the passenger seats 1 in a modular fashion. The flight attendant seat 2 is adjacent to one of the passenger seats and comprises a back rest 11 and a seat cushion 10 supported to be pivotable relative to the back rest 11. The seat cushion 10 and the back rest 11 are retained by a frame 12. An adapter 13 (see FIGS. 2 and 3) beneath a plane defined by the seat cushion 10, is connected with a junction coupling 14 (see FIG. 2) beneath a plane defined by the seat cushion 4. Such construction provides adequate stability of the arrangement and avoids impairments to the freedom of shaping the device. The adapter 13, as well as the junction coupling 14, is provided with an essentially wedge-shaped design which widens in the direction of the junction couplings. The respectively stressed or load-carrying cross-section is adapted because of this wedge-shaped design to a locally existing force application. Instead of a linearly bounded wedge it is also possible to provide a contour bounded by a curve to correspond to the force application.

The flight attendant seat 2 is provided with a higher back rest than that of the passenger seats 1 to improve its functionality. Seat belts 15 are provided for the flight attendant seat 2 as well as for the passenger seats 1. (Safety belts 16 in FIG. 3). A free space 17 is provided beneath the seat cushion 10 of the flight attendant seat 2.

Figure 2:
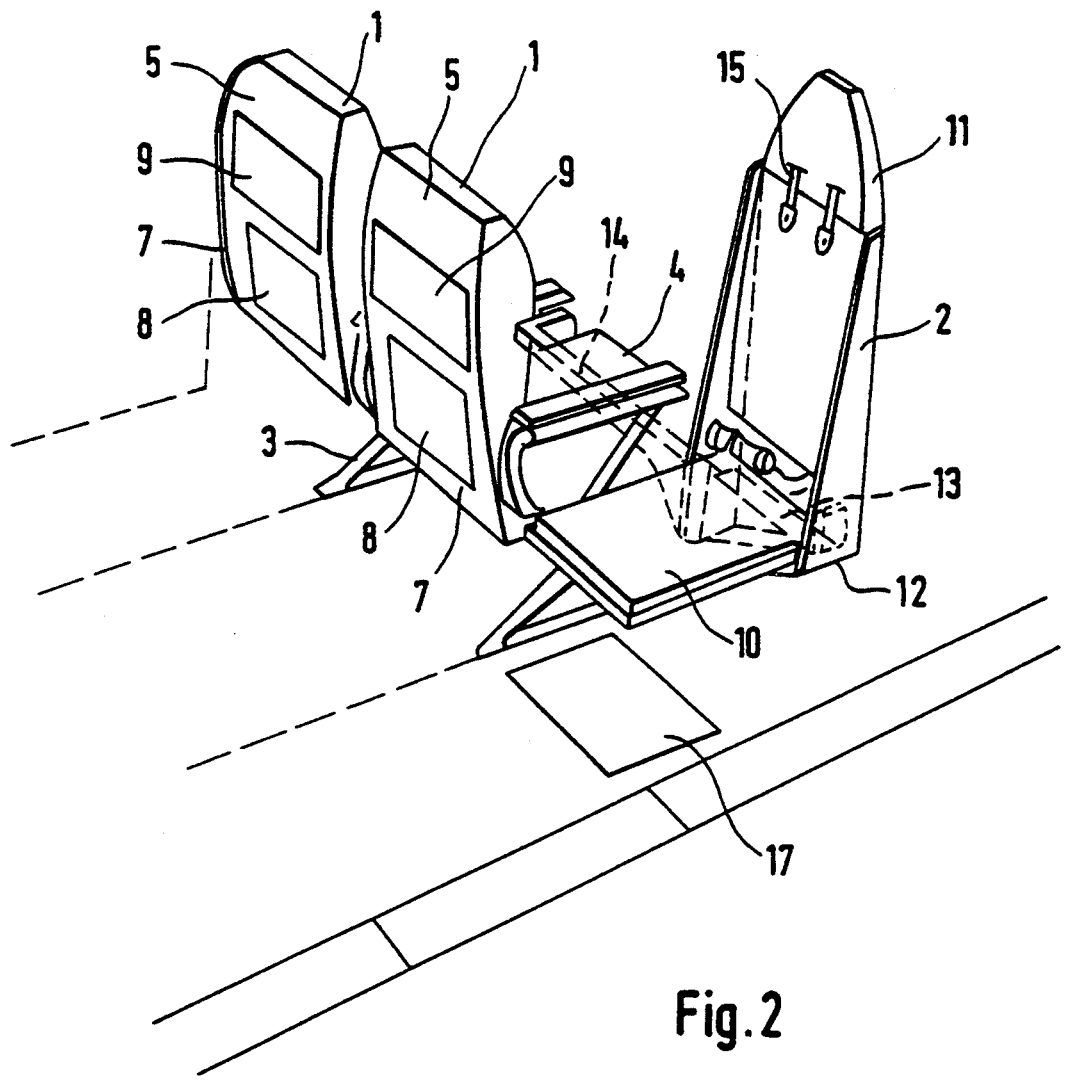
FIG. 2 is another perspective view of the seat row arrangement depicted in FIG. 1.
Figure 3:
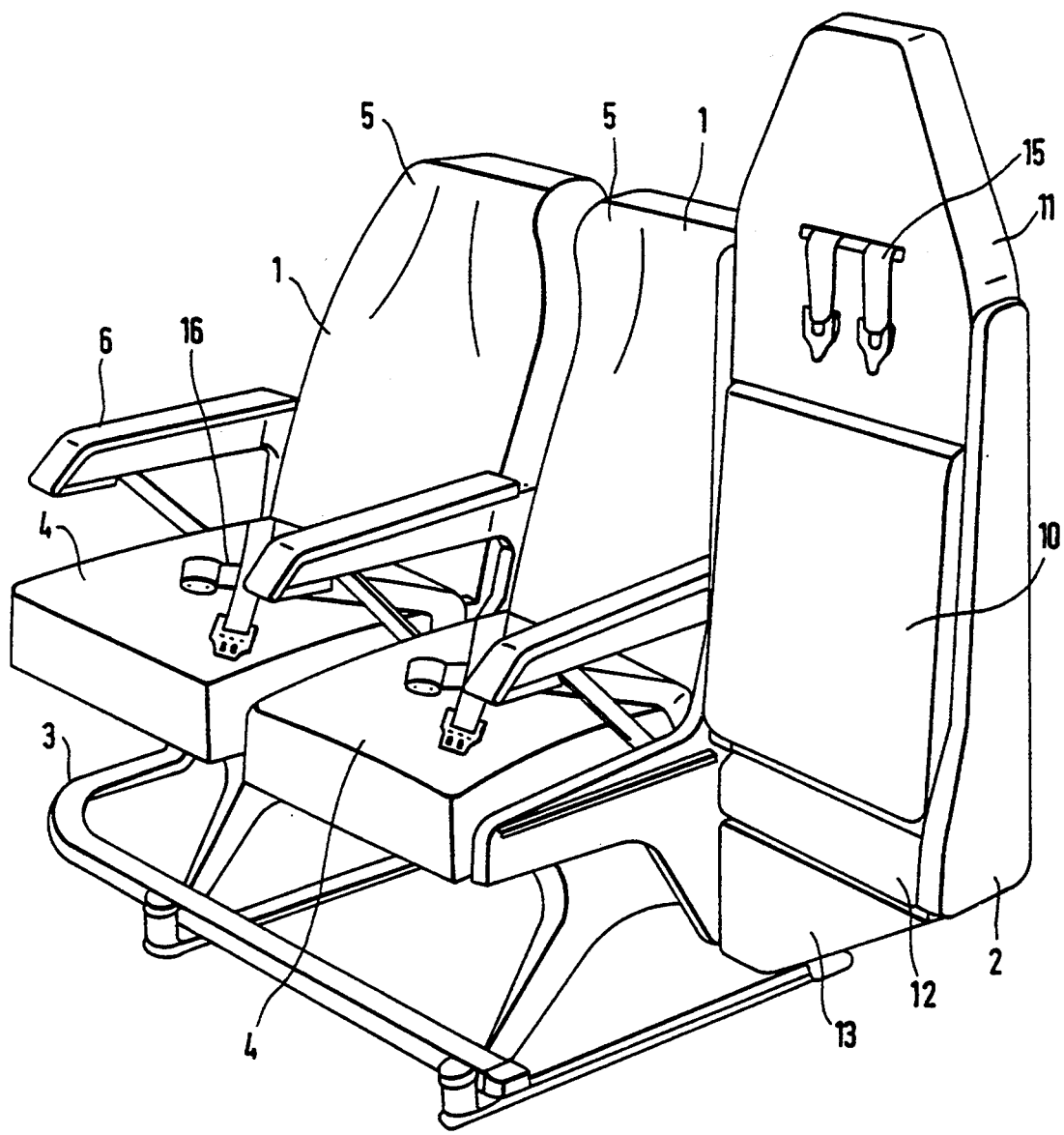
FIG. 3 is a perspective view of another embodiment of the attendant-passenger seat row in which the passenger seats and the flight attendant seat are oriented in the same direction and the flight attendant seat cushion is folded upward.

In the embodiment of FIGS. 1 and 2, the flight attendant seat 2 and the passenger seats 1 face away from each other. In the embodiment of FIG. 3, the flight attendant seat 2 and the passenger seats 1 face the same direction. With a module-like connection, it is possible to connect the flight attendant seat to the passenger seats in a predetermined direction or orientation with respect to each other. With a module-like design, identical components for designing the adapter 3 can be provided in the region of the flight attendant seat 2 and appropriately matching junction couplings 14 can be provided in the region of the passenger seat 1.

The arrangement including the passenger seats 1 and the flight attendant seat 2 is especially suited to be located in the area of doors of an aircraft cabin. When the flight attendant seat cushion 10 is folded up, there is improved accessibility and increased amount of useful space.

While the preferred embodiments of the invention have been illustrated in detail, modifications and adaptations of such embodiments will be apparent to those skilled in the art. However, it is to be expressly understood that such modifications and adaptations are within the spirit and scope of the present invention as set forth in the following claims:

We claim:

1. An attendant-passenger seat row, comprising:
   at least one passenger seat;
   a flight attendant seat substantially adjacent to the passenger seat;
   one adapter for the flight attendant seat, wherein said adapter is disposed beneath a plane defined by the flight attendant seat when said flight attendant seat is in a use position;
   a junction coupling engaging into the adapter and disposed beneath a plane defined by the passenger seat when said passenger seat is in the use position, wherein a support arm is established by the junction coupling engaging into the adapter and holding the flight attendant seat without having any contact with the floor, wherein a free surface remains beneath the flight attendant seat and wherein said surface is usable as an "assist space" beneath the seat cushion of the flight attendant seat;
   a frame substantially supporting said flight attendant seat;
   a back rest; and
   a seat cushion on said flight attendant seat, wherein said seat cushion is pivotable with respect to the back seat.

2. The seat row of claim 1, wherein said passenger seat and the flight attendant seat are oriented in the same direction.

3. The seat row in claim 1, wherein the passenger seat and the flight attendant seat are pointed in opposite directions.

4. The seat row of claim 1, further comprising a second passenger seat, where said passenger seats are in the region of a shorted triple seat row.

5. The seat row of claim 4, wherein the flight attendant seat is connected with the passenger seats in a modular fashion.

6. The seat row of claim 5, wherein the adapter has an essentially wedge-shape design and widens in directions of the junction coupling.

7. The seat row of claim 6, wherein the junction coupling has an essentially wedge-shape design and widens in direction of the adapter.

8. An attendant-passenger row, comprising:
   at least one passenger seat;
   a flight attendant seat substantially adjacent to the passenger seat and connected to the passenger seat in a modular fashion;
   one adapter for the flight attendant seat beneath a plane defined by the flight attendant seat, wherein said adapter is wedge-shaped and is disposed beneath a plane defined by the flight attendant seat when said flight attendant seat is in a use position;
   a junction coupling beneath the plane defined by the passenger seat, wherein the junction is wedge-shaped, wherein said junction coupling engages into the adapter and is disposed beneath a plane defined by the passenger seat when said passenger seat is in the use position, wherein a support arm is established by the junction coupling engaging into the adapter and holding the flight attendant seat without having any contact with the floor, wherein a free surface remains beneath the flight attendant seat and wherein said surface is usable as an "assist space" beneath the seat cushion of the flight attendant seat.

* * * * *